United States Patent
Peck

[11] 4,018,505
[45] Apr. 19, 1977

[54] OBJECTIVE CENTERING NOSEPIECE

[75] Inventor: Theodore H. Peck, Irondequoit, N.Y.

[73] Assignee: Bausch & Lomb Incorporated, Rochester, N.Y.

[22] Filed: Feb. 24, 1975

[21] Appl. No.: 552,675

[52] U.S. Cl. .............................. 350/39; 350/254
[51] Int. Cl.² .................................... G02B 7/04
[58] Field of Search ............ 350/39, 38, 252, 254, 350/257, 10, 67, 318, 247; 354/286

[56] References Cited
UNITED STATES PATENTS

| | | | |
|---|---|---|---|
| 287,904 | 11/1883 | Bulloch | 350/257 |
| 1,960,044 | 5/1934 | Barnack | 350/252 |
| 2,017,823 | 10/1935 | Taylor | 350/257 |
| 2,500,050 | 3/1950 | Wittel | 350/257 |
| 2,571,743 | 10/1951 | Meyer | 350/247 |
| 3,565,512 | 2/1971 | Peck | 350/39 |

*Primary Examiner*—John K. Corbin
*Assistant Examiner*—Jon W. Henry
*Attorney, Agent, or Firm*—Frank C. Parker; DeWitt M. Morgan

[57] ABSTRACT

Apparatus for supporting a microscope objective and aligning the optical axis of such an objective with the optical axis of the microscope. The apparatus includes a rotatable plural objective nosepiece shell provided with a plurality of through openings. All but one of these openings receives an objective supporting and aligning cell which, in turn, supports the individual microscope objectives. Each cell and the corresponding through opening provided in the nosepiece shell are provided with cooperating surfaces which, in conjunction with a locking ring and a washer formed, preferably, of material exhibiting cold flow characteristics, axially position such cell relative to the nosepiece shell. The washer formed of material exhibiting cold flow characteristics is supported between the locking ring and a flange surface provided on the through opening to prevent shifting of the cell in the axial direction. Cooperating means provided on both the cell and the nosepiece shell align the optical axis of the objective with the optical axis of the microscope.

9 Claims, 3 Drawing Figures

OBJECTIVE CENTERING NOSEPIECE

DESCRIPTION OF THE PRIOR ART

In multiple objective microscopes it is desirable if the optical axis for each objective coincided with the optical axis of the microscope. In biological microscopes a satisfactory approximation is obtained by grading each objective. On a test pattern, a circle representing the limiting tolerance of concentricity for a particular power objective is divided into four quadrants. Each objective axis falling within a particular quadrant is color coded with a particular color. In the assembled microscope all objectives having the same color coding are selected.

To obtain greater concentricity two adjusting screws and a leaf spring, angularly spaced from each other at 120° intervals, have been utilized to align the optical axis of an objective with the optical axis of the microscope. This arrangement suffers from the drawback that the position of the objective may be moved through handling when the nosepiece of the microscope is rotated to change power because the presence of the spring permits the position of such an objective to be shifted.

U.S. Pat. No. 3,565,512 to Peck discloses an arrangement for laterally adjusting the position of a lens cell utilizing three set screws angularly spaced from each other at 120° intervals. Axial positioning is achieved by a locking member and a cooperating shouler provided on the stationary body portion of the nosepiece assembly. This patent also discloses apparatus for laterally adjusting the position of a microscope objective to assure optical alignment with the other optical components of the microscope. The apparatus includes a laterally shiftable objective carrier member, a finger operated clamp ring and a detachable alignment fixture. The alignment fixture includes three radially directed adjustment screws. With the finger operated clamping ring exerting only light pressure on the objective carrier the objective is laterally moved to the desired position by manipulation of the adjusting screws. When the objective is in the desired position the finger operated clamping ring is tightened and the alignment fixture removed.

SUMMARY OF THE INVENTION

Apparatus for supporting optics, such as a microscope objective, and aligning the optical axis of such optics with another axis. The apparatus includes a support member which has a plurality of through openings provided therein. Each such opening has a radially inwardly projecting flange including first and second spaced surfaces. The apparatus also includes optics supporting cells each of which includes: (a) means for supporting the optics to be aligned; (b) a means for cooperating with a locking means; and (c) a shoulder which seats against one of the spaced surfaces of the inwardly projecting flange to axially position the cell within its respective through opening. The apparatus further includes a locking member and a resilient, yieldable member which engages the other of the spaced surfaces of the inwardly projecting flange and is held in compression therewith by the locking member. Finally, the apparatus includes a position adjusting mechanism. This mechanism, which is supported by and movable relative to the support member, engages the cell to adjust the position of the cell to align the axes. Preferably, the cell and the position adjusting mechanism are designed to cooperate with each other so as to urge the shoulder of the cell against the one of the spaced surfaces provided on the inwardly projecting flange. It is also preferred that the optics supporting cell include an additional external shoulder which is spaced from the first shoulder a distance equal to the spacing between the first and second spaced surfaces of the inwardly projecting flange and that the resilient, yieldable member be dimensioned so as to also be in engagement with the second shoulder.

DESCRIPTION OF THE PREFERRED EMBODIMENT

Figure 1:
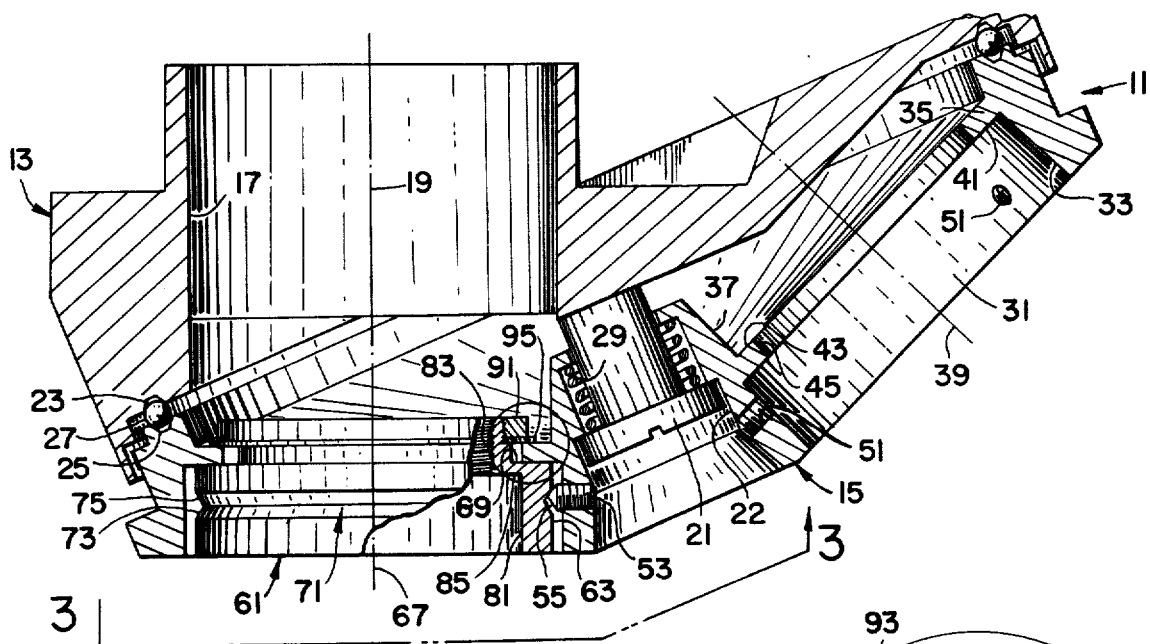
FIG. 1 is a sectional view of the preferred embodiment.

As is illustrated in FIG. 1, nosepiece assembly 11 includes a stationary body member 13 and a rotatable plural objective nosepiece shell 15. Body member 13, which is securable (by means not shown) to, for instance, the pillar of a microscope (also not shown), includes a through opening 17 which, in the preferred embodiment, is substantially concentric about the optical axis 19 of the microscope. Nosepiece shell 15 is secured to body member 13 by a thread stud 21 received within bore 22. Interposed between V-grooves 23, 25 provided on, respectively, body member 13 and nosepiece shell 15 is a bearing 27 in the form of either steel balls or an O-ring of a suitable synthetic resin polymer such as marketed by du Pont under the trademark Teflon. Compression spring 29, interposed between nosepiece shell 15 and stud 21, urges nosepiece shell 15 toward body member 13 to thereby maintain bearing 27 in V-grooves 23, 25 and under compression.

Nosepiece shell 15 is provided with a plurality of through openings 31. Each opening 31 includes a cylindrical bore 33, an inwardly extending flange 35 and an inner bore 37. Cylindrical bore 33 is substantially concentric with respect to bore axis 39. Flange 35 includes first and second spaced surfaces 41 and 43 interconnected by cylindrical surface 45. Surfaces 41 and 43 lie in parallel planes which are perpendicular to bore axis 39. Surface 45 is substantially concentric with respect to bore axis 39.

Figure 3:
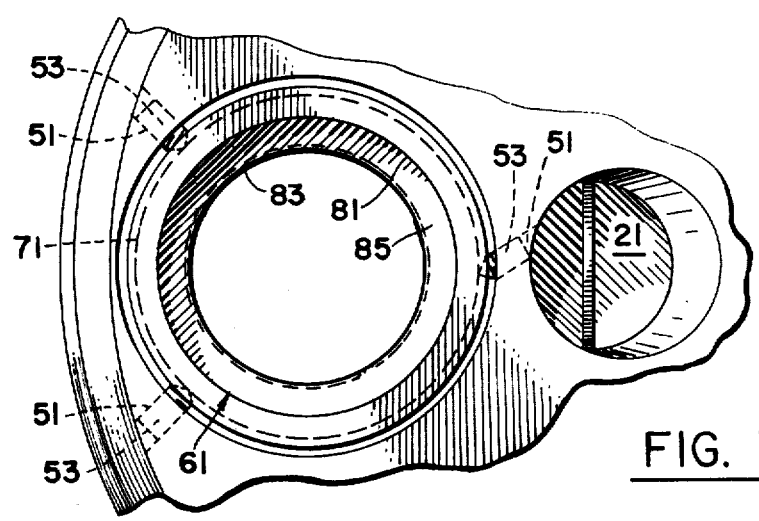
FIG. 3 is a partial end view taken along line 3—3 of the embodiment illustrated in FIG. 1.

As is evident from inspection of FIG. 3, each of the cylindrical bores 33 is provided with three threaded openings 51 each of which receives a set screw 53 having a conical point 55. As is also evident from inspection of FIG. 3, the threaded openings 51, for each through opening 31, are angularly spaced from each other at approximately 120° intervals. Further, in the illustrated embodiment where nosepiece shell 15 carries an even number of objectives, each of the threaded openings 51 which opens onto bore 22 is cocked with respect to its normal radial position so as to be readily accessible to a wrench for adjusting.

Figure 2:
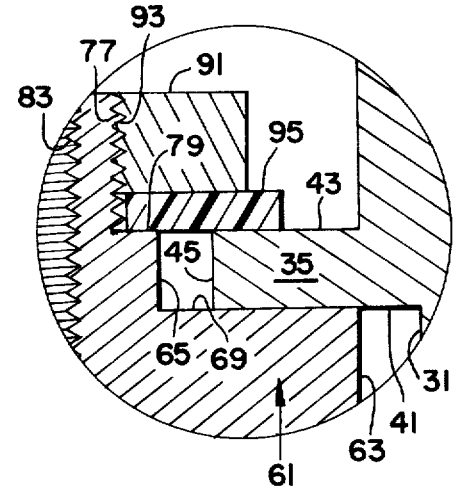
FIG. 2 is an enlargement of a portion of FIG. 1.

Received within all but one of the through openings 31 is an objective supporting and aligning cell 61. As is evident from inspection of FIGS. 1 and 2, each cell 61 includes first and second outer cylindrical surfaces 63 and 65 both of which are substantially concentric with respect to cell axis 67. Cylindrical surfaces 63 and 65 are interconnected by shoulder 69 which lies in a plane which is perpendicular to cell axis 67. Cylindrical surface 63 includes an inwardly extending endless V-shaped groove 71 defined by inclined surfaces 73, 75. As is evident from inspection of FIGS. 1 and 2 the diameter of surface 65 is smaller than the diameter of surface 45. Finally, as is also evident from inspection of FIGS. 1 and 2, the exterior of cell 61 is provided with threaded surface 77 which is connected with cylindrical surface 65 by shoulder 79. Shoulder 79 lies in a plane which is perpendicular to cell axis 67 and is spaced from shoulder 69 a distance equal to the spacing between surfaces 41 and 43.

The interior of cell 61 includes an inner cylindrical surface 81 and an inner threaded cylindrical surface 83 which are interconnected by an internal shoulder 85. Surfaces 81 and 83 are preferably substantially concentric with respect to cell axis 67. Shoulder 85 lies in a plane which is perpendicular to axis 67 and parallel to the plane of surface 69. Threaded cylindrical surface 83 cooperates with the external threads provided on a microscope objective (not shown) to hold such an objective securely within cell 61.

To initially secure each cell 61 in its respective through opening 31 locking ring 91 is utilized. Ring 91 has internal threads 93 the same pitch and diameter as provided on threaded surface 77. As is evident from inspection of FIG. 1, the radial thickness of annular locking ring 91 is such that its outside diameter is greater than the internal diameter of cylindrical surface 45 provided on nosepiece shell 15. As is also evident from inspection of FIGS. 1 and 2, interposed between locking ring 91 and surface 43 of flange 35 is an annular ring 95 of synthetic resin polymer, such as du Pont Teflon, having cold flow properties. Ring 95 is also in engagement with shoulder 79 of cell 61. The cold flow characteristics of ring 95 insure that, when locking ring 91 is in engagement with ring 95, shoulder 69 is maintained in firm engagement with surface 41 of nosepiece shell 15. This arrangement is important as it prevents axial shifting of cell 61 relative to nosepiece shell 15 to thereby prevent axial shifting of the microscope objective (not shown) which is mounted within cell 61. This prevention of axial shifting is important in microscopes because the depth of field of a microscope objective is very small, normally in the order of 0.00019 inches for a 100x, 1.25 N.A. objective. In place of ring 95, a bellville washer, a wavy washer or a bearing loading spring may be utilized.

Nosepiece shell 15 is also provided with one objective supporting cell (not shown) similar to cell 61 except that the outer cylindrical surface located between the equivalent of shoulders 69 and 79 is of the same diameter as the diameter of surface 45. Such a cell is held in place by a locking ring 91 and an annular ring 95 combination as is used with each cell 61. Since such a cell cannot be shifted in a plane perpendicular to bore axis 39 the optical axis of the objective (also not shown) mounted in this cell defines the optical axis 19 of the microscope.

After the reference cell and each cell 61 have been secured in their respective openings 31, via locking ring 91, the optical axis of the objective (not shown) received in each cell 61 is aligned with the optical axis 19 of the microscope. This alignment is accomplished by sequentially tightening the three set screws 53 which are provided for each through opening 31. As is evident from inspection of FIG. 1, conical surface 55 of each set screw 53 engages inclined surface 75 provided on cylindrical surface 63. Such arrangement serves to additionally bias shoulder 69 into firm engagement with surface 41 to thereby securely lock cell 61 in its adjusted position.

Whereas the drawing and accompanying description have shown and described the preferred embodiment of the present invention, it should be apparent to those skilled in the art that various changes may be made in the form of the invention without affecting the scope thereof.

What I claim is:

1. Apparatus for supporting optics, such as a microscope objective, and aligning the optical axis of said optics with an axis, said apparatus comprising:
   a. support means, said support means including a through opening, said through opening including an inwardly projecting flange having first and second spaced surfaces;
   b. an optics supporting cell, said cell including means for supporting said optics, a first shoulder and means for cooperating with a locking means, said cell being received within said through opening with said first shoulder in engagement with one of said first and second spaced surfaces of said inwardly projecting flange;
   c. locking means, said locking means engaging said cooperating means and positioned in spaced relation to the other of said first and second spaced surfaces of said inwardly projecting flange;
   d. resilient, yieldable means, said means being positioned between and in engagement with both said locking means and said other of said first and second spaced surfaces of said inwardly projecting flange to insure engagement between said one of said first and second spaced surfaces of said inwardly projecting flange and said first shoulder; and
   e. position adjusting means, said adjusting means being supported by and moveable relative to said support means and engaging said cell to adjust the position of said cell in a direction perpendicular to said axis to align said optical axis of said optics with said axis.

2. The apparatus as set forth in claim 1 wherein said resilient, yieldable means is a washer formed of synthetic resin polymer having cold flow properties.

3. The apparatus as set forth in claim 2 wherein said cell and said adjusting means include cooperating means for biasing said first shoulder into engagement with said one of said first and second spaced surfaces of said inwardly projecting flange.

4. The apparatus as set forth in claim 3 wherein said biasing means includes a surface, inclined with respect to said first shoulder, provided on said cell and means, provided on said adjusting means, for engaging said inclined surface to thereby urge said first shoulder into engagement with said one of said first and second spaced surfaces of said inwardly projecting flange.

5. The apparatus as set forth in claim 4 wherein said adjusting means include a plurality of set screws, said set screws received within a like plurality of threaded openings provided on said support means.

6. The apparatus as set forth in claim 5 wherein said cell includes a first exterior surface provided with an endless groove and wherein said set screws include cone points, said groove including said inclined surface, said inclined surface being spaced from said first shoulder and said threaded openings being spaced from said one of said first and second spaced surfaces of said inwardly projecting flange such that said cone points engage said inclined surface.

7. The apparatus as set forth in claim 2 wherein said cell includes a second shoulder, said second shoulder interconnected to said first shoulder by an exterior surface and spaced from said first shoulder a distance equal to the spacing between said first and second spaced surfaces of said projecting flange and wherein said washer is in engagement with said second shoulder.

8. The apparatus as set forth in claim 7 wherein said first and second spaced surfaces of said inwardly projecting flange are interconnected by a cylindrical surface having a first diameter and wherein said exterior surface of said cell is cylindrical and has a second diameter smaller than said first diameter.

9. The apparatus as set forth in claim 1 wherein said support means is a plural-objective nosepiece shell rotatably mounted to a stationary body member of a miroscope.

* * * * *